United States Patent
Hu et al.

(10) Patent No.: US 12,051,982 B2
(45) Date of Patent: Jul. 30, 2024

(54) METHOD OF CLAMPING OUTPUT CURRENT OF THREE-PHASE POWER CONVERTER

(71) Applicant: DELTA ELECTRONICS, INC., Taoyuan (TW)

(72) Inventors: Kai-Wei Hu, Taoyuan (TW); Ping-Heng Wu, Taoyuan (TW); Lei-Chung Hsing, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 162 days.

(21) Appl. No.: 17/961,800

(22) Filed: Oct. 7, 2022

(65) Prior Publication Data
US 2023/0223866 A1    Jul. 13, 2023

(30) Foreign Application Priority Data

Jan. 12, 2022    (CN) .......................... 202210030342.2

(51) Int. Cl.
*H02M 7/5387*    (2007.01)
*H02M 7/487*    (2007.01)

(52) U.S. Cl.
CPC ....... *H02M 7/487* (2013.01); *H02M 7/53871* (2013.01)

(58) Field of Classification Search
CPC .. H02M 7/483; H02M 7/487; H02M 7/53871; H02M 7/5387
See application file for complete search history.

(56) References Cited

U.S. PATENT DOCUMENTS

| | | | |
|---|---|---|---|
| 7,075,267 B1 * | 7/2006 | Cheng | H02M 7/53875 318/434 |
| 9,287,835 B2 | 3/2016 | Chen et al. | |

(Continued)

FOREIGN PATENT DOCUMENTS

| | | |
|---|---|---|
| CN | 104682692 A | 6/2015 |
| TW | 201014146 A | 4/2010 |

(Continued)

OTHER PUBLICATIONS

Premzel B. et al:"Robust Induction Motor Control for Electric Vehicles", International Electric Vehicle Symposium. Anaheim, Dec. 5-7, 1994; [International Electric Vehicle Symposium], San Francisco, EVAA, US, vol. SYMP. 12, Dec. 5, 1994, pp. 467-476; Fig. 1, XP000488495.

(Continued)

*Primary Examiner* — Adolf D Berhane
(74) *Attorney, Agent, or Firm* — MUNCY, GEISSLER, OLDS & LOWE, P.C.

(57) ABSTRACT

A method of clamping an output current of a three-phase power converter is provided. The three-phase power converter includes three switching bridge arms and provides a three-phase output voltage command, and each switching bridge arm has an upper switch and a lower switch connected in series. The method includes steps of: determining that the output current is greater than a first current threshold to activate a current clamping control procedure, comparing a carrier signal with the three-phase output voltage command to turn on the lower switches by a first zero vector when the carrier signal is rising and turn on the upper switches by a second zero vector when the carrier signal is falling, determining that the output current is greater than a second current threshold to activate an overcurrent protec- (Continued)

tion procedure, wherein the second current threshold is greater than the first current threshold.

10 Claims, 9 Drawing Sheets

(56) References Cited

U.S. PATENT DOCUMENTS

| | | | |
|---|---|---|---|
| 10,601,303 B2 * | 3/2020 | Xu | ........................ H02M 1/083 |
| 2009/0283129 A1 | 11/2009 | Foss | |
| 2015/0349654 A1 | 12/2015 | Wang et al. | |
| 2019/0305693 A1 | 10/2019 | Lee et al. | |
| 2019/0372567 A1 | 12/2019 | Yoshida et al. | |
| 2020/0287455 A1 * | 9/2020 | Okuyama | ......... H02M 7/53871 |
| 2023/0132524 A1 * | 5/2023 | Wu | ........................ H02M 1/083 |
| | | | 363/97 |

FOREIGN PATENT DOCUMENTS

| | | |
|---|---|---|
| TW | 201545456 A | 12/2015 |
| TW | I-543640 B | 7/2016 |
| TW | I699084 B | 7/2020 |

OTHER PUBLICATIONS

Search Report dated May 23, 2023 of the corresponding European patent application No. 22201915.0.

* cited by examiner

METHOD OF CLAMPING OUTPUT CURRENT OF THREE-PHASE POWER CONVERTER

BACKGROUND

Technical Field

The present disclosure relates to a method of controlling output current of a power converter, and more particularly to a method of clamping output current of a three-phase power converter.

Description of Related Art

The statements in this section merely provide background information related to the present disclosure and do not necessarily constitute prior art.

FIG. 1 shows a block diagram of a systematic architecture of a related motor driver, in which a motor 900, which is driven by a power converter 100, controls a load, and details can be also obtained by referring to FIG. 3. FIG. 2 shows a circuit diagram of the related three-phase power converter 100. The power converter 100 is composed of a three-arm structure including six switches (each arm respectively includes an upper arm switch $S_{u1}$, $S_{v1}$, $S_{w1}$ and a lower arm switch $S_{u2}$, $S_{v2}$, $S_{w2}$). Each phase output is connected to a center point of the upper arm switch and the corresponding lower arm switch, which is a known circuit structure widely used in industrial products.

In various industrial applications, the power converter 100 is often used to convert electrical energy. As shown in FIG. 3, the power converter 100 disposed between on the AC side and the DC side is used to convert the electrical energy of the battery 200 and provides required power to a load 300. Here, the place where the power converter 100 is connected to the battery 200 may be referred to as the "DC side", which may be connected to batteries, solar panels, capacitors, etc. in different practical applications. A load side in FIG. 3 may also be referred to as the "AC side", which can be connected to motors, power grids, industrial products, etc. in different practical applications.

Specifically, FIG. 3 shows a block diagram of a systematic architecture of the power converter 100 to which a pulse width modulation is applied. According to different practical applications, a controller 400 corresponding to the power converter 100 is designed in different manners. For example, when the load 300 is a voltage source, the power converter 100 is often used as an active front end, and therefore the controller 400 should adjust a power factor of the AC side. If the load 300 is a motor, the power converter 100 should be designed to control various types of motors. Therefore, following different applications, the design of the controller 400 corresponding to the power converter 100 should be different, but a same purpose is to control the voltage on the AC side. Therefore, the controller 400 generates a corresponding voltage command $V_{ref}$ to control the output voltage of the AC side. Moreover, the pulse width modulation (PWM) technology 500 can convert (modulate) the voltage command $V_{ref}$ to output a switching signal to an arm switch of the power converter 100 to output the desired voltage. As shown in FIG. 3, the output voltage of the power converter 100 is in a pulse waveform. Ideally, if there is no loss in the system, an average of the pulse voltage will be the voltage command $V_{ref}$.

Most of the pulse width modulation technology used in traditional three-phase power converters is a switching method called space vector pulse width modulation (SVPWM), which is to compare the voltage command of each of the three phases with a carrier ePWM. As shown in FIG. 4, when the phase voltage command $V_{ref}$ is greater than the carrier ePWM, the upper-arm switch is turned on, and the lower-arm switch is turned off. As shown in FIG. 5, if three-phase voltage commands $v_u^*$, $v_v^*$, $v_w^*$ are compared with the carrier ePWM, switching signals for the arm switches of the three-phase arms can be sorted out as shown in FIG. 5 (when $v_u^* > v_v^* > v_w^*$). By analyzing various combinations of voltage commands and transforming output voltages into a d-q (direct-quadrature) synchronization frame, a space vector diagram composed of voltage vectors $V_0$-$v_7$ can be sorted out, as shown in FIG. 6. For example, the vector $v_1$(100) represents the U-phase upper arm switch is turned on, the V-phase and W-phase lower arm switches are turned on; the output voltages generated by the vectors $v_0$(000) and $v_7$(111) are all zero, so they are called zero vectors; and the remaining vectors $v_1$-$v_6$ are called active vectors. This PWM method has been widely used in various power converter products.

From FIG. 6 the basic concept of SVPWM can be explained: the three-phase voltage commands $v_u^*$, $v_v^*$, $v_w^*$ are transformed to the synchronization frame, and an angle θ between the voltage command v* and the q axis is acquired during frame transformation. Different angles θ make the voltage command v* fall within any vector triangle in FIG. 6. This voltage command will be synthesized by the voltage vectors forming the triangle within one switching cycle. The voltage command v* falls in the triangular interval composed of the vectors $v_1$, $v_2$, $v_0$, $v_7$; in this condition, in a PWM switching cycle, as shown in FIG. 5, the output voltage vector is $v_7$-$v_2$-$v_1$-$v_0$-$v_1$-$v_2$-$v_7$ in sequence. Therefore, when the voltage command v* falls within any triangle interval in FIG. 6, the voltage command v* is composed of two active vectors $v_x$, $v_y$ and two zero vectors $v_0$, $v_7$ in the triangle. Table 1 defines the relationship between the voltage intervals and the angle θ of voltage command v*.

TABLE 1

| voltage intervals ($R_{vol}$) | angle (θ) of voltage command v* |
|---|---|
| I | 0° to 60° |
| II | 60° to 120° |
| III | 120° to 180° |
| IV | 180° to 240° |
| V | 240° to 300° |
| VI | 300° to 360° |

However, in order to avoid components of the power converter from being damaged by overcurrent, an overcurrent protection mechanism is usually designed in a motor driving system. Accordingly, how to provide a method of controlling output current of a power converter, and more particularly to a method of clamping output current of a three-phase power converter is a critical topic in the present disclosure.

SUMMARY

An objective of the present disclosure is to provide a method of clamping an output current of a three-phase power converter to solve problems of the existing technology.

In order to achieve the above-mentioned objective, in the method of clamping the output current of the three-phase power converter, the three-phase power converter includes three switching bridge arms and provides a three-phase output voltage command, and each switching bridge arm includes an upper switch and a lower switch connected in series. The method includes steps of: (a) determining that the output current is greater than a first current threshold to activate a current clamping control procedure, (b) comparing a carrier signal with the three-phase output voltage command to turn on the lower switches by a first zero vector when the carrier signal is rising and turn on the upper switches by a second zero vector when the carrier signal is falling, and (c) determining that the output current is greater than a second current threshold to activate an overcurrent protection procedure, wherein the second current threshold is greater than the first current threshold.

In one embodiment, in step (b), when the carrier signal reaches to a peak value, the first zero vector turns on the lower switches; when the carrier signal reaches to a valley value, the second zero vector turns on the upper switches.

In one embodiment, in step (c), the overcurrent protection procedure is performed by turning off all of the upper switches and all of the lower switches of the three switching bridge arms.

In one embodiment, when the current clamping control procedure is performing, two different active vectors are provided between the first zero vector and the second zero vector.

In one embodiment, the first zero vector is used to control all of the lower switches of the three switching bridge arms to be turned on, and the second zero vector is used to control all of the upper switches of the three switching bridge arms to be turned on.

In one embodiment, in step (b), when the carrier signal reaches to a peak value or a valley value, the current clamping control procedure is interrupted.

In one embodiment, in step (b), when the carrier signal reaches to the peak value to interrupt the current clamping control procedure, the first zero vector subsequently turns on the lower switches; when the carrier signal reaches to the valley value to interrupt the current clamping control procedure, the second zero vector subsequently turns on the upper switches.

In one embodiment, the method further includes a step between step (b) and step (c) of: (d) determining that the output current is greater than a third current threshold to activate a second current clamping control procedure, wherein the third current threshold is greater than the first current threshold and less than the second current threshold.

In one embodiment, when the second current clamping control procedure is performing, all of the upper switches and all of the lower switches of the three switching bridge arms are turned off.

In one embodiment, the three-phase power converter is connected to a load, and the load is a generator or a motor operating in a generation mode.

Accordingly, the output current control method of the power converter provided by the present disclosure can significantly reduce motor vibration, significantly reduce ripples of the output currents, avoid the output current (energy) from being recharged to the DC voltage side, and reduce switching loss.

It is to be understood that both the foregoing general description and the following specific description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following specific description of the embodiment, with reference made to the accompanying drawing as follows.

DETAILED DESCRIPTION

Figure 1:
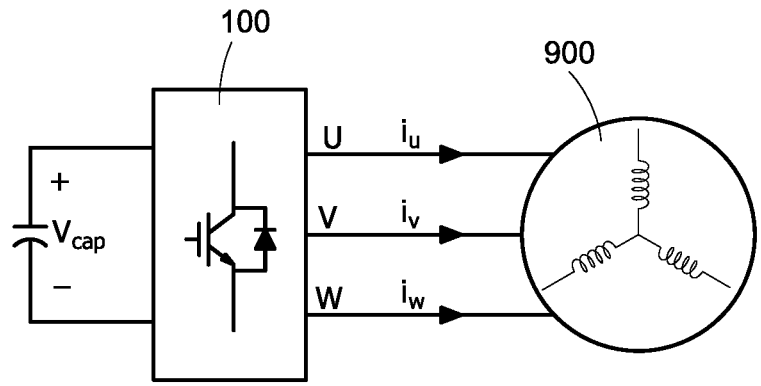
FIG. 1 is a block diagram of a systematic architecture of a related motor driver.
Figure 2:
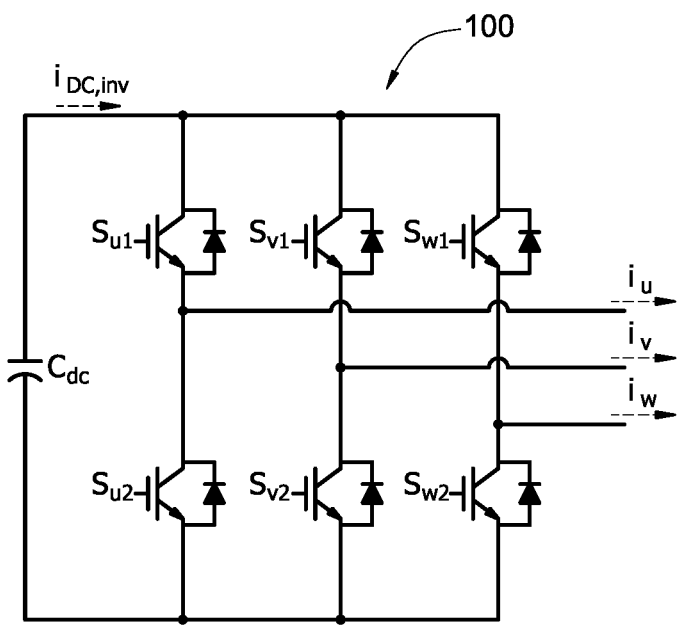
FIG. 2 is a circuit diagram of a related three-phase power converter.
Figure 3:
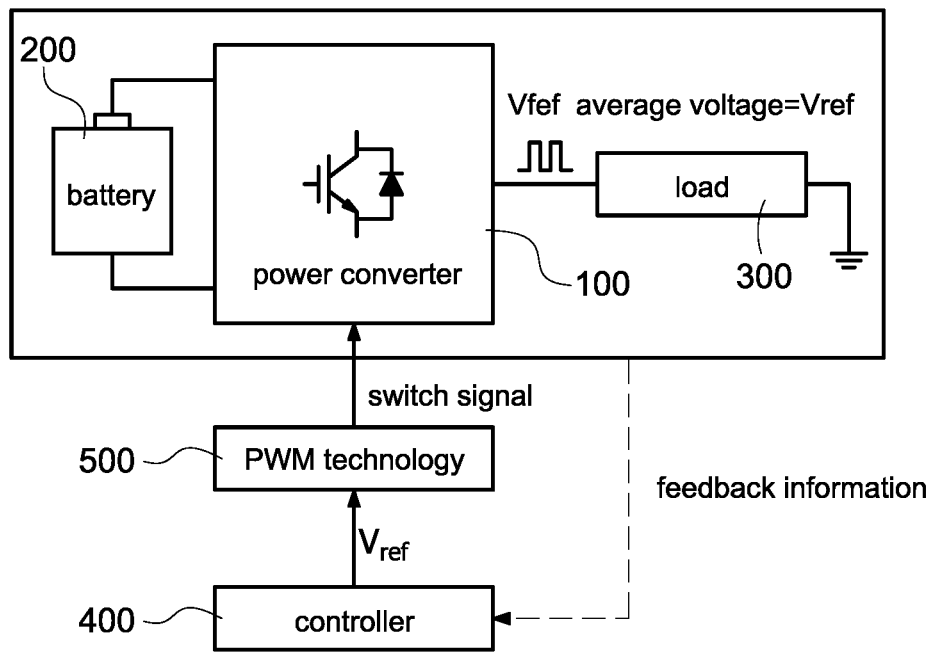
FIG. 3 is a block diagram of a systematic architecture of the power converter to which a pulse width modulation is applied.
Figure 4:
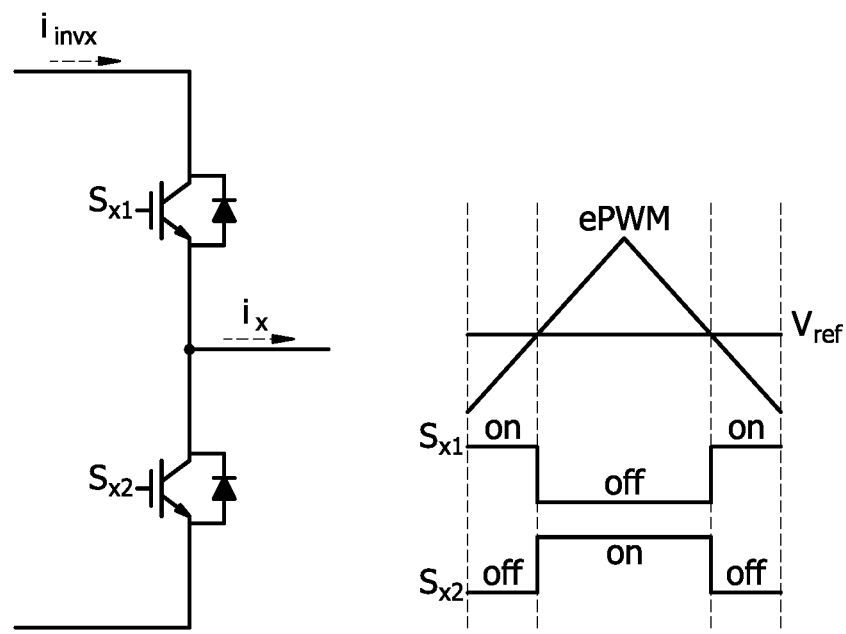
FIG. 4 is a schematic waveform of switching the related power converter in a PWM manner.

Reference will now be made to the drawing figures to describe the present disclosure in detail. It will be understood that the drawing figures and exemplified embodiments of present disclosure are not limited to the details thereof.

Figure 7:
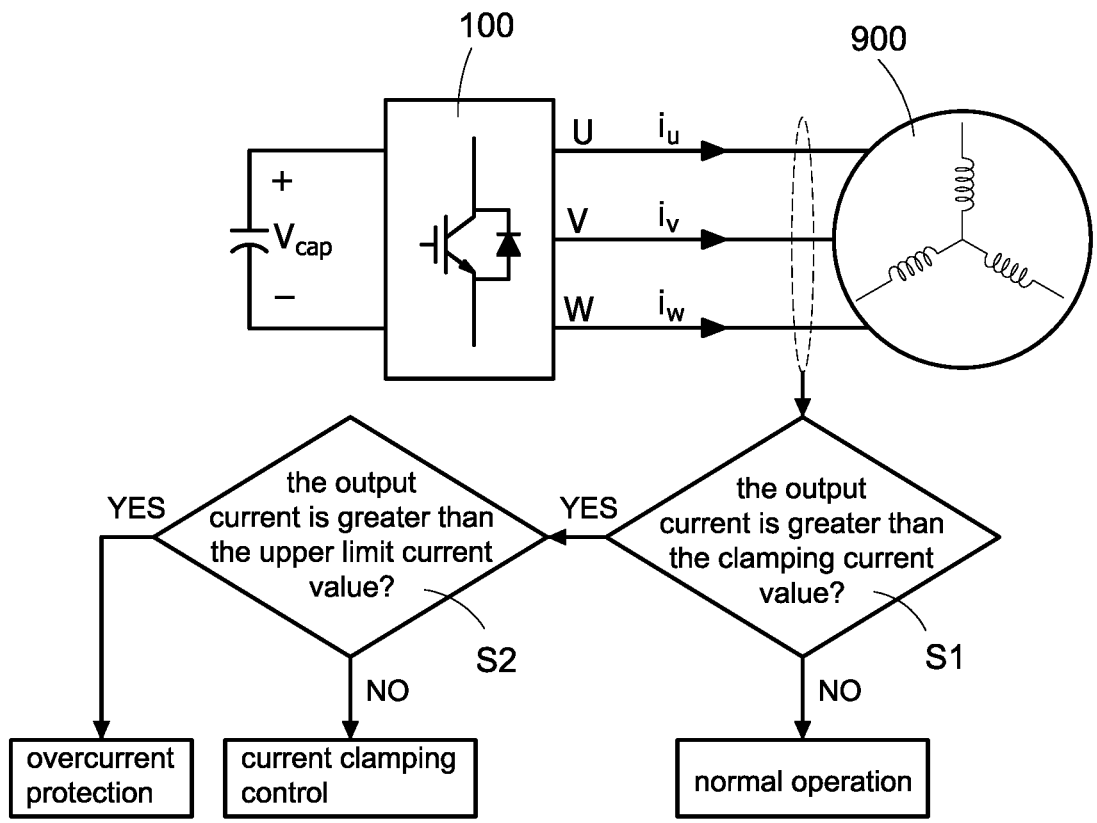
FIG. 7 is a schematic diagram of a current protection mechanism applied to the motor driver.

As mentioned above, in order to avoid components of the power converter from being damaged by overcurrent, an overcurrent protection mechanism is usually designed in a motor driving system. FIG. 7 shows a schematic diagram of a current protection mechanism applied to the motor driver 900. The motor driving system may use hardware or firmware detection to feedback phase output currents $i_u$, $i_v$, $i_w$ to determine current magnitudes. When any of the phase output currents $i_u$, $i_v$, $i_w$ suddenly rises greater than an upper limit current value or exceeds an overcurrent protection command (that is, the determination in step S2 is "Yes"), the power converter 100 enters an overcurrent protection mode, in which all of the arm switches of the power converter 100 are turned off and the motor driving system stops operating.

However, sometimes the motor load just encounters a sudden transient change, such as instant on-load, instant off-load, or controller glitch. After the sudden transient change is over, the phase output currents $i_u$, $i_v$, $i_w$ can be stably outputted. Consequently, this overcurrent protection mechanism limits an operational flexibility of the power converter 100. In order to increase an operating range of the motor driver, the protection mechanism introduces a "current clamping control" to assist the power converter 100 to survive the overcurrent transient. That is to say, when any of the phase output currents $i_u$, $i_v$, $i_w$ is instantaneously greater than a clamping current value or exceeds a clamping current protection command (that is, the determination in step S1 is "Yes"), the overcurrent protection mechanism of the power converter 100 will not be immediately activated. In other words, when one of the phase output currents $i_u$, $i_v$, $i_w$ is less than the upper limit current value or does not exceed the overcurrent protection command (i.e., the determination in step S2 is "No"), the power converter 100 enters a current clamping control mode to suppress output current, so that all of the arm switches of power converter 100 will not be turned off to avoid system shutdown, which increases the operating range of the power converter 100 to survive certain transient states. However, if the phase output currents $i_u$, $i_v$, $i_w$ are too high to be suppressed during the current clamping control mode, the system will still enter the overcurrent protection mode.

Figure 8:
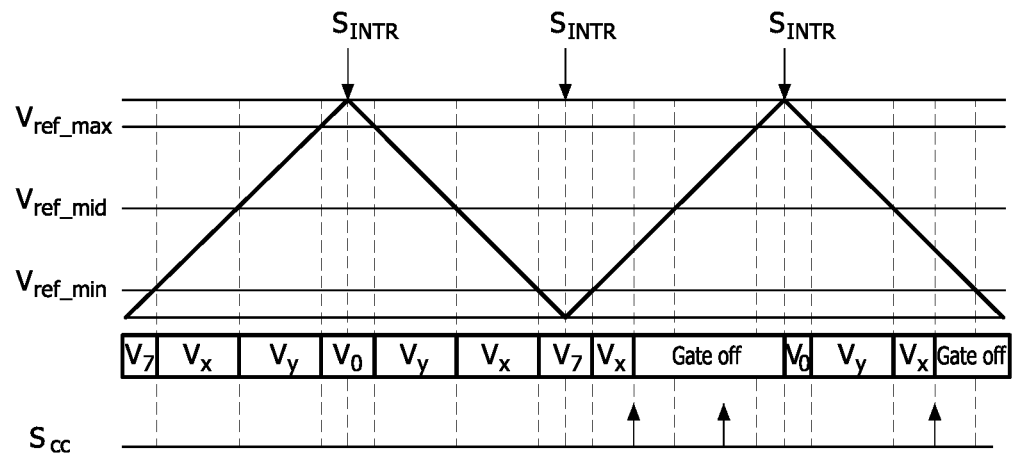
FIG. 8 is a schematic diagram of a current clamping method.
Figure 10:
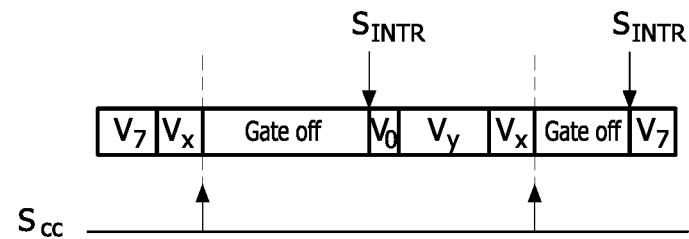
FIG. 10 is a schematic diagram of turning off all switches of the power converter.

Voltage commands and signals generated during the current clamping control mode are shown in FIG. 8. Three-phase voltage commands (or three-phase output voltage commands) in FIG. 8 are $V_{ref\_max}$, $V_{ref\_mid}$, $V_{ref\_min}$ in an order of the maximum value, the middle value, and the minimum value, which are respectively compared with a triangle wave (carrier wave) to generate a PWM signal. Every switching cycle includes two active vectors $v_x$, $v_y$ and two zero vectors zero vectors $V_0$, $v_7$. As shown in FIG. 7, when any of the phase output currents $i_u$, $i_v$, $i_w$ is greater than the clamping current value (that is, the determination in step S1 is "Yes"), the system in the overcurrent protection mode generates a current clamping signal $S_{CC}$ to the controller. When the controller receives the current clamping signal $S_{CC}$, such as flag signals indicated by arrows in FIG. 8, all of the switching signals immediately turns off gates of the arm switches (which is called "gate off state"). As shown in FIG. 10, when the first flag signal or the third flag signal is activated, the gate off state immediately effects on the active vector $v_x$. If the flag signal (such as the second flag signal) appears in the gate off state, the gate off state remains.

Figure 9:
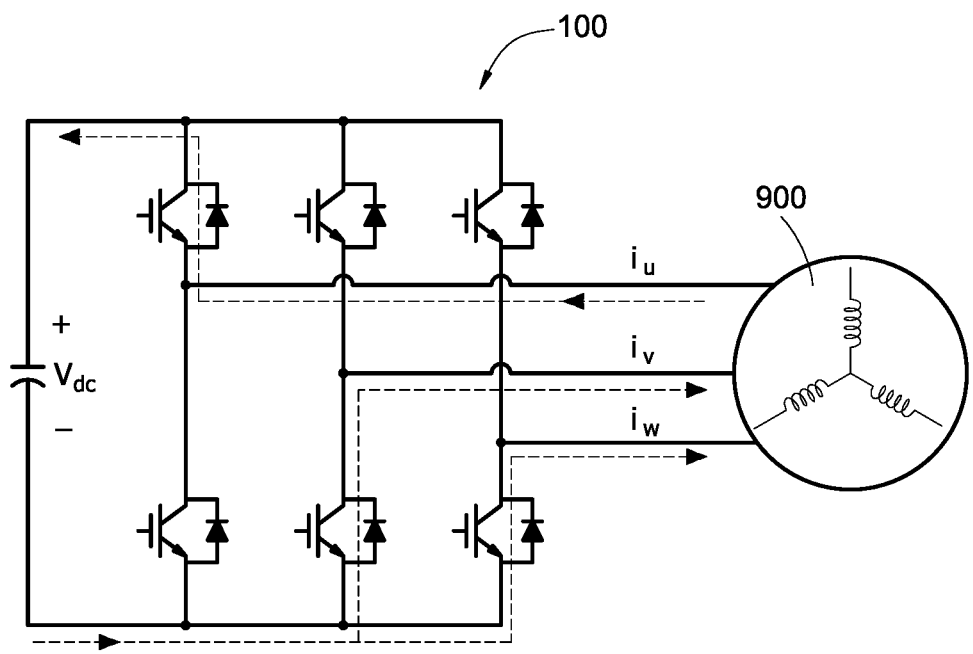
FIG. 9 is an equivalent circuit diagram of the three-phase power converter controlled by the current clamping method.

$S_{INTR}$ shown in FIG. 8 is an interruption signal of the controller, usually generated at the peak or valley of a switching cycle, and used to reset the flag signal of the current clamping signal $S_{CC}$. When the controller receives the interruption signal $S_{INTR}$, it will determine the output current again. If the controller determines that the magnitude of the output current is still greater than the clamping current value, the current clamping control mode is maintained to continuously suppress the output current. On the contrary, if the controller determines that the current magnitude has been less than the clamping current value (because of the suppression during the current clamping control mode), the interruption signal aborts current clamping at the peak or valley of a switching cycle to resume normal operation of PWM output, and an equivalent circuit at this time is shown in FIG. 9. If present current flows are $i_u<0$, $i_v>0$, $i_w>0$, the output currents are discharged through the corresponding back-connected diodes (instead of the upper and lower switches) according to their current flows, so as to clamp the output currents. However, a wire-to-wire voltage across the motor side is influenced by the DC side voltage $V_{dc}$, for example, if the wire-to-wire voltage jumps from $+V_{dc}$ to $-V_{dc}$ or from $-V_{dc}$ to $+V_{dc}$, large current ripples on the output side current are induced to make the mechanical motor vibrate greatly.

Moreover, by turning off all of the switches to achieve output current suppression, another phenomenon that will occur is that the output current (energy) is fed to the DC voltage side, which causes the DC side voltage rising to activate overvoltage protection.

Figure 16:
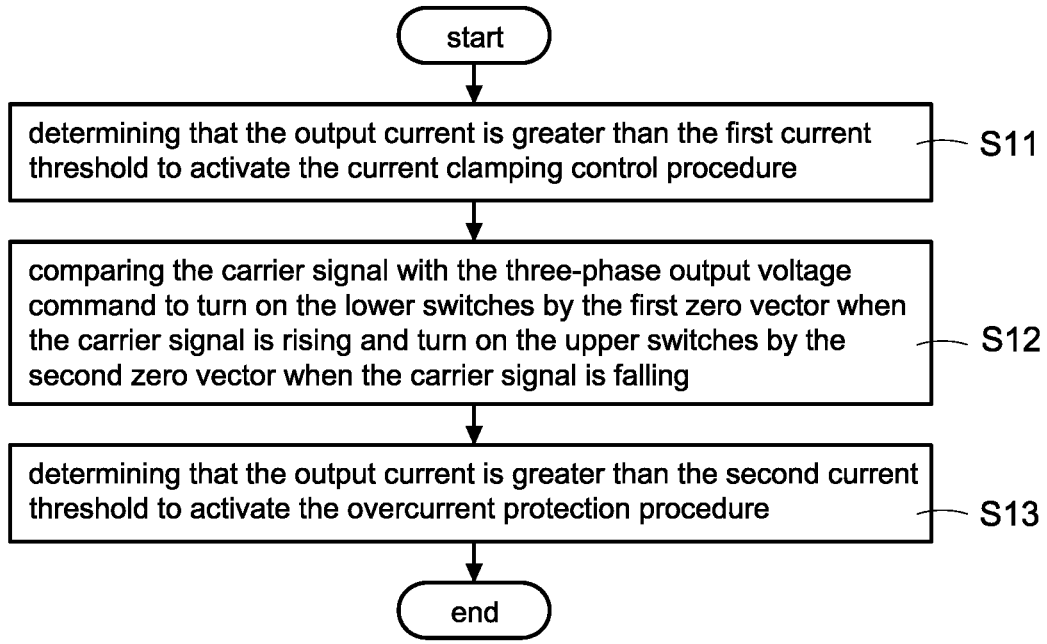
FIG. 16 is a flowchart of a method of clamping an output current of the three-phase power converter according to the present disclosure.

FIG. 16 shows a flowchart of a method of clamping an output current of the three-phase power converter according to the present disclosure. The three-phase power converter includes three switching bridge arms and provides a three-phase output voltage command, and each switching bridge arm includes an upper switch and a lower switch connected in series. The steps of the current clamping method are described in detail as follows.

Figure 11:
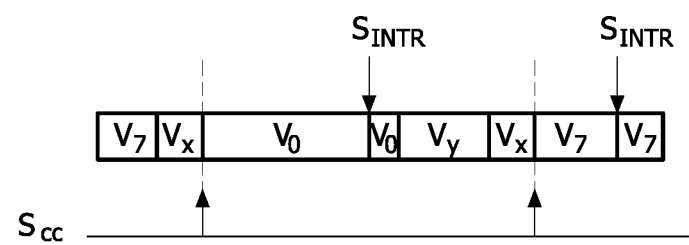
FIG. 11 is a schematic diagram of controlling the switches of the power converter by zero vectors according to the present disclosure.
Figure 13:
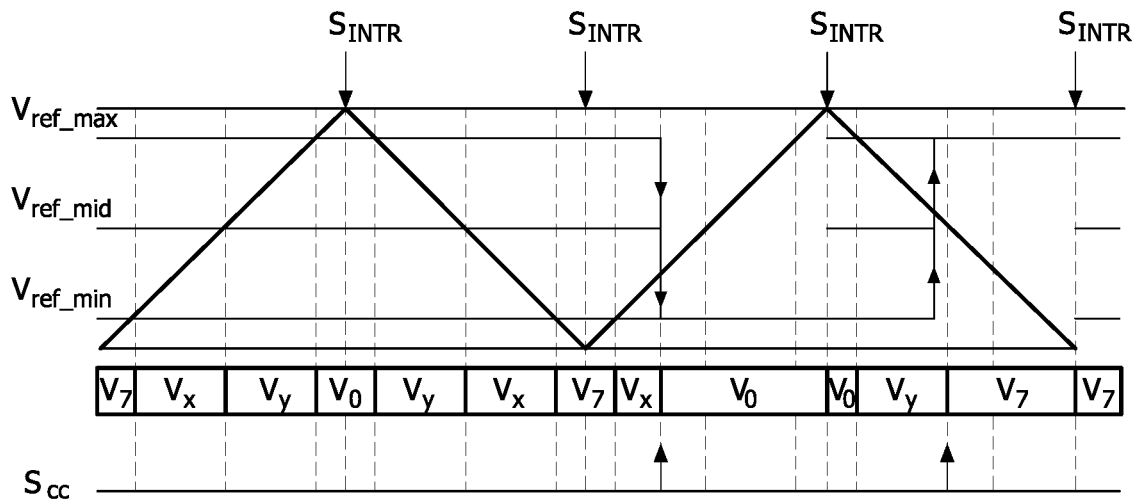
FIG. 13 is a specific schematic diagram of controlling the switches of the power converter by zero vectors according to a first embodiment of the present disclosure.

First, determining that the output current is greater than a first current threshold to activate a current clamping control procedure (step S11). As mentioned above, the current clamping control method induces a large overvoltage on the output side of the motor, which is prone to induce large ripples on the motor current and make the motor vibrate. Therefore, the method for clamping the output current of the three-phase power converter proposed by the present disclosure does not use the method of turning off all of the switches of the power converter (as shown in FIG. 10), but the switches of the power converter 100 are switched by the zero vector (as shown in FIG. 11). Specifically, as shown in FIG. 11, when the controller receives the first flag signal of the current clamping signal $S_{CC}$, the upper and lower switches of the three-phase bridge arm are controlled by the first zero vector $v_0$. That is, the first zero vector $v_0$ controls all of the lower switches to be turned on and all of the upper switches to be turned off, but not all of the upper and lower switches are turned off. Similarly, when the controller receives the second flag signal of the current clamping signal $S_{CC}$, all of the upper switches are turned on and all of the lower switches are turned off by the second zero vector $v_7$. In particular, as shown in FIG. 13, when the carrier signal ramps up to the peak value, the current clamping control is interrupted, the lower switches are subsequently turned on by the first zero vector $v_0$. When the carrier signal ramps down to the valley value, the current clamping control is interrupted, the upper switches are subsequently turned on by the second zero vector $v_7$. Therefore, switching losses of the upper and lower switches can be reduced.

Figure 12A:
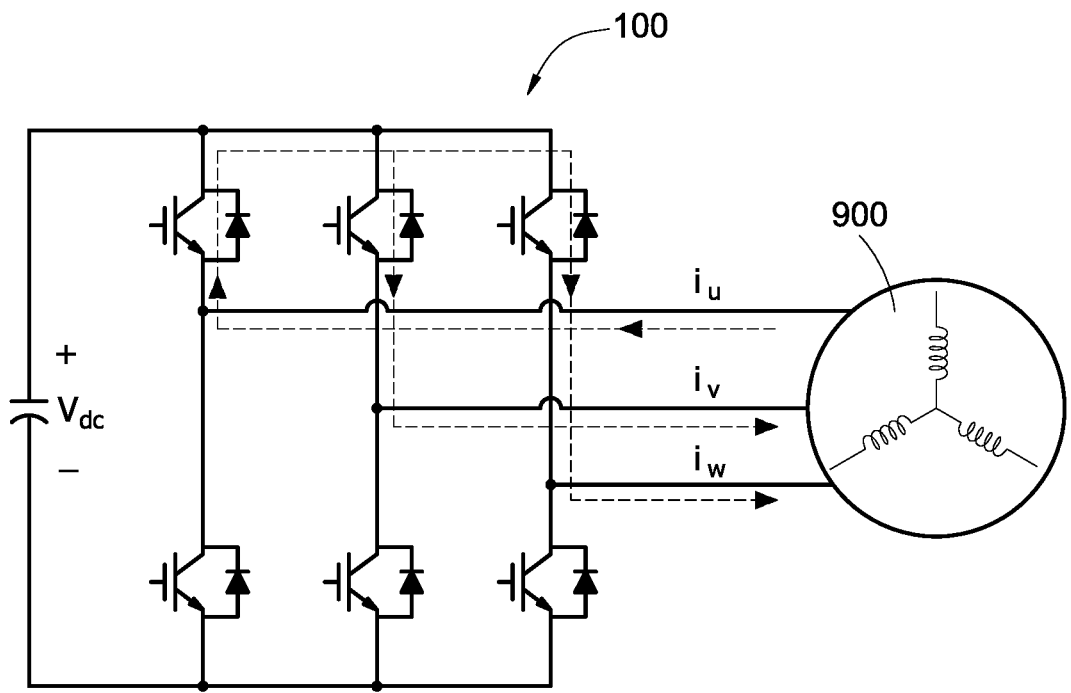
FIG. 12A is a circuit diagram of the power converter switching to the zero vector according to a first embodiment of the present disclosure.
Figure 12B:
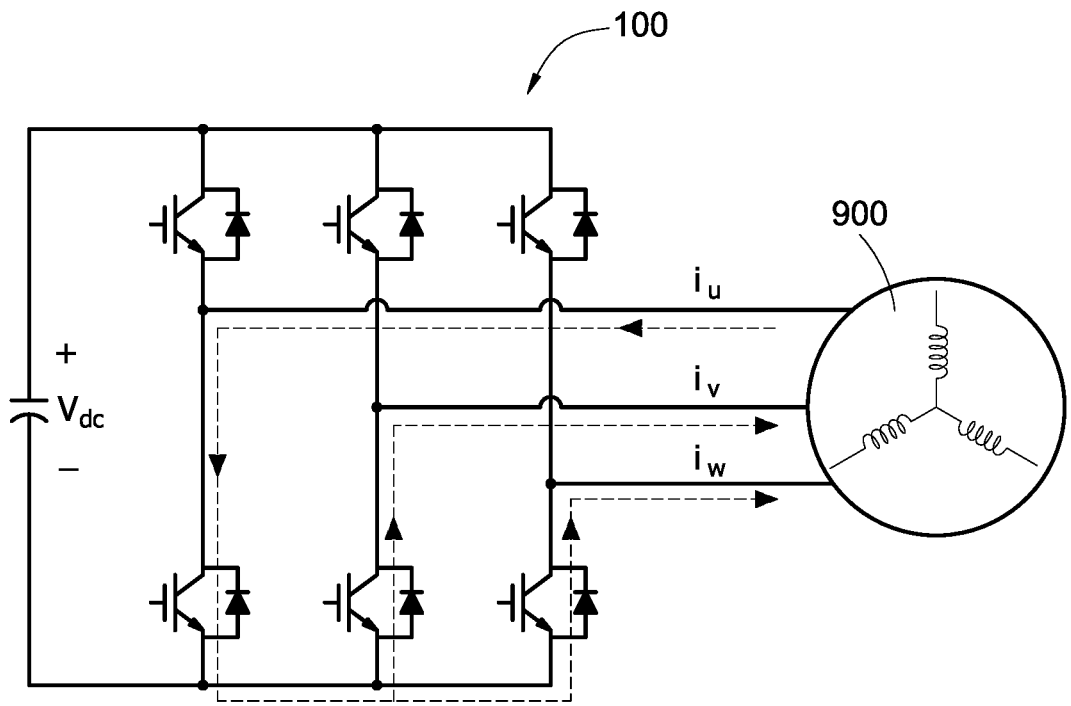
FIG. 12B is a circuit diagram of the power converter switching to the zero vector according to a second embodiment of the present disclosure.

In this condition, equivalent circuits for FIG. 13 are shown in FIG. 12A and FIG. 12B. FIG. 12A shows a circuit diagram of the power converter 100 switching to the second zero vector $v_7$, and FIG. 12B shows a circuit diagram of the power converter 100 switching to the first zero vector $v_0$. Since all of the upper switches are turned on to make the output currents flow inside of the power converter 100, the output currents can be suppressed; and all of the lower switches are turned off to avoid the output currents (energy) from flowing back to the DC voltage side. Meanwhile, when the controller switches to the zero vector $v_0$, the wire-to-wire cross voltage at the motor 900 is zero, which significantly reduces ripples on the output current to significantly reduce vibration of the motor 900 under the current clamping control.

Figure 5:
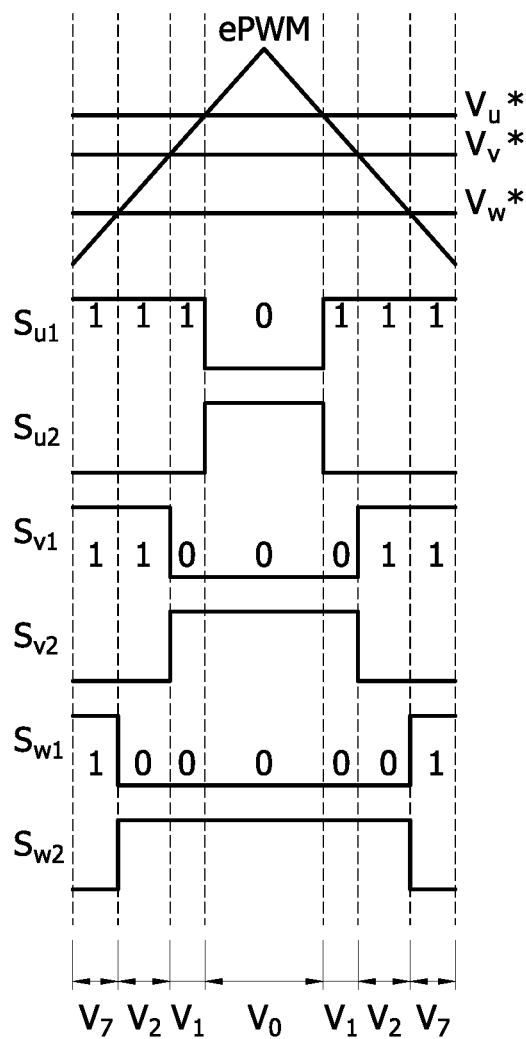
FIG. 5 is a schematic waveform of switching the related three-phase power converter in an SVPWM manner.
Figure 6:
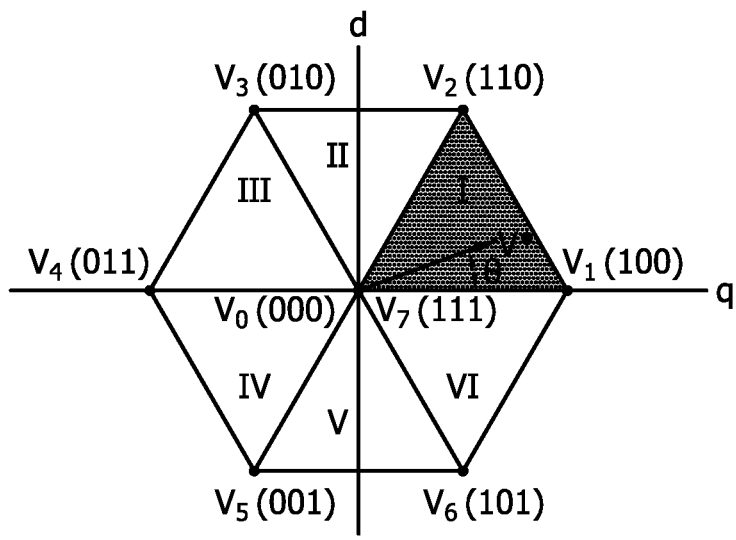
FIG. 6 is a vector space diagram composed of voltage vectors under the related SVPWM switching manner.

Afterward, comparing the carrier signal with the three-phase output voltage command to turn on the lower switches by the first zero vector when the carrier signal is rising and turn on the upper switches by the second zero vector when the carrier signal is falling (step S12). The zero-vector switching method may be seen in FIG. 6, and there are two switching manners for: the (first) zero vector $v_0$ and the (second) zero vector $v_7$. As shown in FIG. 5, at the peak of the carrier wave is the zero vector $v_0$, and at the valley of the carrier wave is the zero vector $v_7$. Moreover, in order to reduce switching loss during the current clamping control, when the carrier signal is rising from the valley to the peak (that is, the rising interval), the controller selects the zero vector $v_0$ in the current clamping control when receiving the first flag signal of the current clamping signal $S_{CC}$. On the contrary, when the carrier signal is falling from the peak to the valley (that is, the falling interval), the controller selects the zero vector $v_7$ in the current clamping control when receiving the second flag signal of the current clamping signal $S_{CC}$.

FIG. 13 shows a specific schematic diagram of controlling the switches of the power converter by the zero vectors according to a first embodiment of the present disclosure. The vector for switching the switches is determined by comparing the three-phase voltage commands ($V_{ref\_max}$, $V_{ref\_mid}$, $V_{ref\_min}$) with the carrier signal. In FIG. 13, The three-phase voltage commands are classified into a maximum value ($V_{ref\_max}$), a middle value ($V_{ref}$ mid), and a minimum value ($V_{ref\_min}$). When the current clamping signal $S_{CC}$ is detected, if the carrier signal is in the rising interval, all of the three-phase voltage commands are clamped to the minimum voltage value ($V_{ref\_min}$) to generate the zero vector $v_0$. On the other hand, when the current clamping signal $S_{CC}$ is detected, if the carrier signal is in the falling interval, all three-phase voltage commands are clamped to the maximum voltage value ($V_{ref\_max}$) to generate the zero vector $v_7$.

Figure 14:
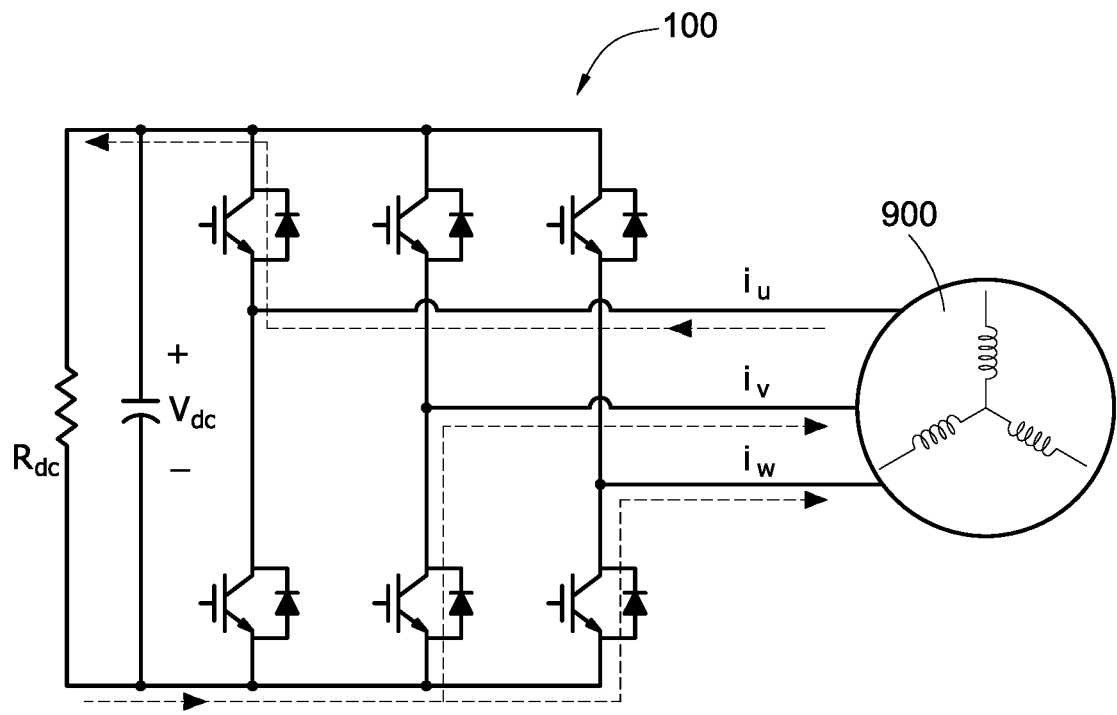
FIG. 14 is an equivalent circuit diagram of controlling switches of the power converter by zero vectors according to the present disclosure.

As mentioned above, the method for clamping the output current of the three-phase power converter proposed by the present disclosure mainly uses the zero vectors instead of turning off all of the switches of the power converter so as to reduce ripples on the output currents. However, this method is only applicable when the motor operates in a "motor mode." If the motor operates in a "generator mode," using the zero-vector operation cannot reduce ripples on the output current. In this condition, it is still necessary to turn off all of the switches of the power converter so that the energy on the AC side is fed to a braking resistor $R_{dc}$ on the DC side for consumption, thereby reducing AC currents from the motor acting as a generator, as shown in FIG. 14.

Figure 15:
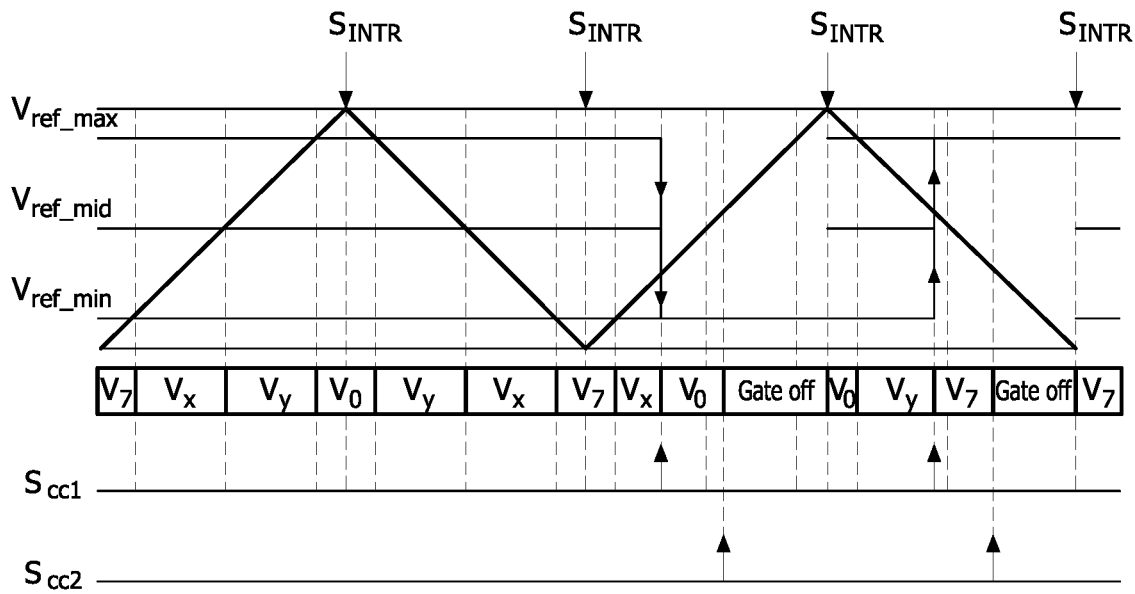
FIG. 15 is a specific schematic diagram of controlling switches of the power converter by zero vectors according to a second embodiment of the present disclosure.

However, for a motor driver, it could be unknown whether the motor is currently operating in the "motor mode" or the "generator mode," and therefore in the current clamping control, two current clamping signals, such as a first current clamping signal $S_{CC1}$ and a second current clamping signal $S_{CC2}$, can be used to determine the "motor mode" and the "generator mode," as shown in FIG. 15. Specifically, if any of the output currents $i_u$, $i_v$, $i_w$ is greater than the first current threshold, wherein the first current threshold is corresponding to the first current clamping signal $S_{CC1}$ used for determination, that is, if any of the output currents $i_u$, $i_v$, $i_w$ is greater than the first current clamping signal $S_{CC1}$, the controller selects the desired zero vector as described above. If the motor operates in the "motor mode", the output currents $i_u$, $i_v$, $i_w$ can be suppressed to gradually converge, and ripples on the output current are smaller. On the contrary, if the motor operates in the "generator mode", the output currents $i_u$, $i_v$, $i_w$ will continue to increase. In other words, when the motor operates in the "generator mode", the output currents $i_u$, $i_v$, $i_w$ cannot be effectively suppressed by only a single current clamping control.

Therefore, the present disclosure further provides a second current clamping control mode further executed in the current clamping control mode. When any of the output currents $i_u$, $i_v$, $i_w$ is greater than the first current threshold, but ripples on the output currents $i_u$, $i_v$, $i_w$ cannot be reduced after the zero-vector operation, the second current clamping control mode is activated. Specifically, it is further determined that when any of the output currents $i_u$, $i_v$, $i_w$ is greater than a third current threshold, wherein the third current threshold is greater than the first current threshold and less than the second current threshold, the upper switches and the lower switches of three groups of the switch arms are controlled to be turned off. In other words, by turning off all of the switches (the upper switches and the lower switches) of the power converter, the energy on the AC side is fed to the braking resistor $R_{dc}$ on the DC side for consumption, thereby reducing the AC current.

Finally, determining that the output current is greater than a second current threshold to activate an overcurrent protection procedure (step S13). In particular, the second current threshold is greater than the first current threshold (and is also greater than the third current threshold), and the second current threshold is corresponding to the second current clamping signal $S_{CC2}$ used for determination. When any of the output currents $i_u$, $i_v$, $i_w$ is greater than the second current threshold, that is any of the output currents $i_u$, $i_v$, $i_w$ is greater than the second current clamping signal $S_{CC2}$, it means that the two-stage current clamping control cannot effectively suppress the output currents $i_u$, $i_v$, $i_w$. In this condition, the power converter 100 enters the overcurrent protection, and all of the switches of the power converter 100 are turned off and the system stops running, thereby reducing the output current.

In summary, the present disclosure has the following features and advantages:

1. The current clamping control method for the output current of the three-phase power converter provided by the present disclosure does not turn off all of the switches of the power converter, but uses zero vectors to control the switches of the power converter so that vibration can be significantly reduced when the motor is operating under current clamping control.

2. The current clamping control method provided in the present disclosure reduces the a cross-voltage of the output voltage by using the zero vectors so that ripples on the output currents are significantly reduced.

3. The current clamping control method provided in the present disclosure can not only achieve the suppression of the output current but also prevent the output current (energy) from flowing back to the DC voltage side.

4. When the carrier signal rises to the peak value or falls to the valley value, the current clamping control is interrupted, and the same zero vector continues to control the switches to be turned on, which can reduce switching loss.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of clamping an output current of a three-phase power converter, the three-phase power converter comprising three switching bridge arms and configured to provide a three-phase output voltage command, and each switching bridge arm comprising an upper switch and a lower switch connected in series, the method comprising steps of:
   (a) determining that the output current is greater than a first current threshold to activate a current clamping control procedure,
   (b) comparing a carrier signal with the three-phase output voltage command to turn on the lower switches by a first zero vector when the carrier signal is rising and turn on the upper switches by a second zero vector when the carrier signal is falling, and
   (c) determining that the output current is greater than a second current threshold to activate an overcurrent protection procedure, wherein the second current threshold is greater than the first current threshold.

2. The method of clamping the output current of the three-phase power converter as claimed in claim 1, wherein in step (b), when the carrier signal reaches to a peak value, the first zero vector turns on the lower switches; when the carrier signal reaches to a valley value, the second zero vector turns on the upper switches.

3. The method of clamping the output current of the three-phase power converter as claimed in claim 1, wherein in step (c), the overcurrent protection procedure is performed by turning off all of the upper switches and all of the lower switches of the three switching bridge arms.

4. The method of clamping the output current of the three-phase power converter as claimed in claim 1, wherein when the current clamping control procedure is performing, two different active vectors are provided between the first zero vector and the second zero vector.

5. The method of clamping the output current of the three-phase power converter as claimed in claim 1, wherein the first zero vector is a vector used to control all of the lower switches of the three switching bridge arms to be turned on, and the second zero vector is a vector used to control all of the upper switches of the three switching bridge arms to be turned on.

6. The method of clamping the output current of the three-phase power converter as claimed in claim 1, wherein in step (b), when the carrier signal reaches to a peak value or a valley value, the current clamping control procedure is interrupted.

7. The method of clamping the output current of the three-phase power converter as claimed in claim 6, wherein in step (b), when the carrier signal reaches to the peak value to interrupt the current clamping control procedure, the first zero vector subsequently turns on the lower switches; when the carrier signal reaches to the valley value to interrupt the current clamping control procedure, the second zero vector subsequently turns on the upper switches.

8. The method of clamping the output current of the three-phase power converter as claimed in claim 1, further comprising a step between step (b) and step (c) of:
   (d) determining that the output current is greater than a third current threshold to activate a second current clamping control procedure, wherein the third current threshold is greater than the first current threshold and less than the second current threshold.

9. The method of clamping the output current of the three-phase power converter as claimed in claim 8, wherein when the second current clamping control procedure is performing, all of the upper switches and all of the lower switches of the three switching bridge arms are turned off.

10. The method of clamping the output current of the three-phase power converter as claimed in claim 8, wherein the three-phase power converter is connected to a load, and the load is a generator or a motor operating in a generation mode.

* * * * *